July 23, 1929.  F. MAUQUOI  1,721,827
MEANS FOR HYDRAULIC MARINE PROPULSION
Filed April 19, 1928   2 Sheets-Sheet 1
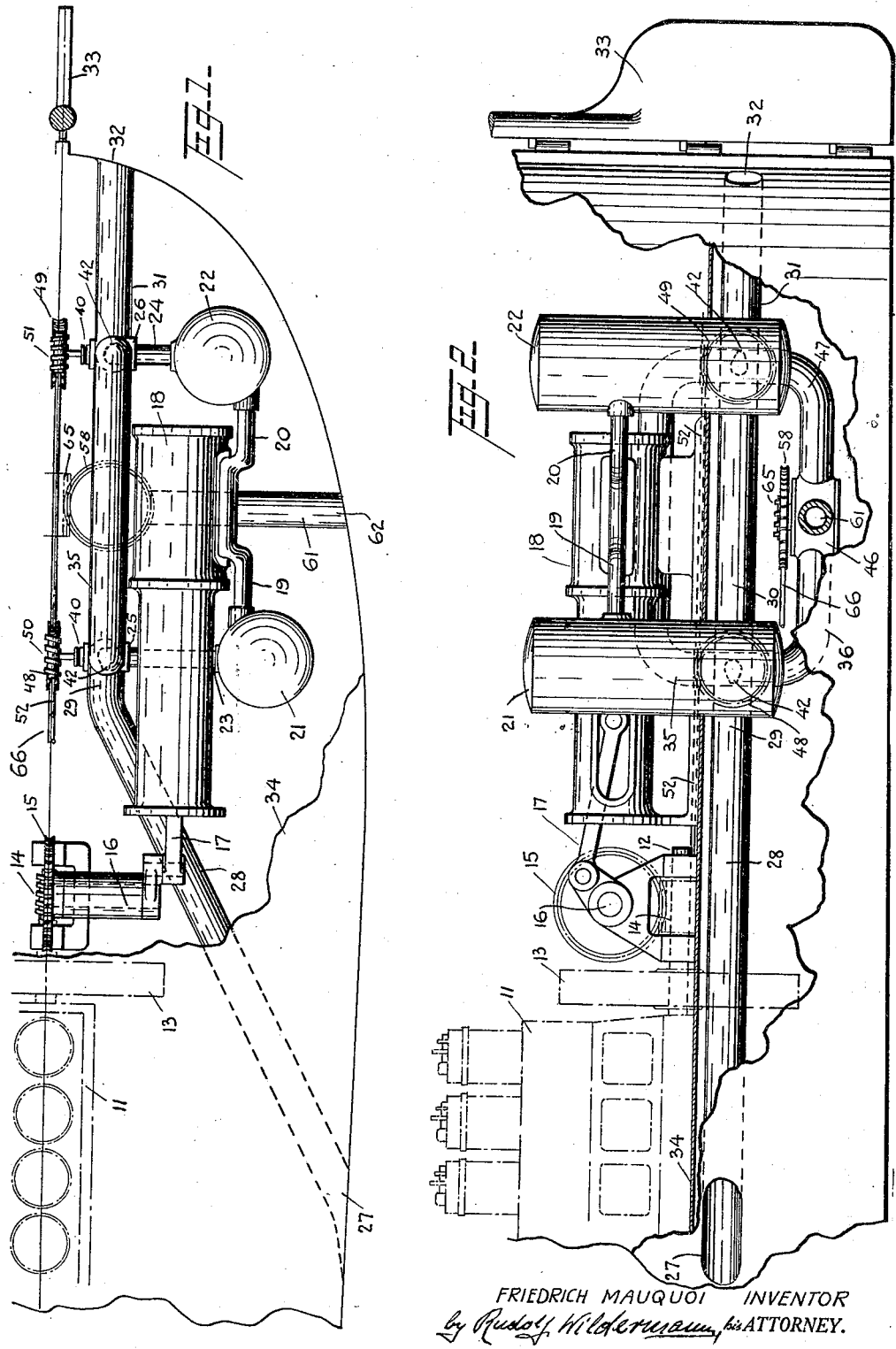
FRIEDRICH MAUQUOI INVENTOR
by Rudolf Wildermann, his ATTORNEY.

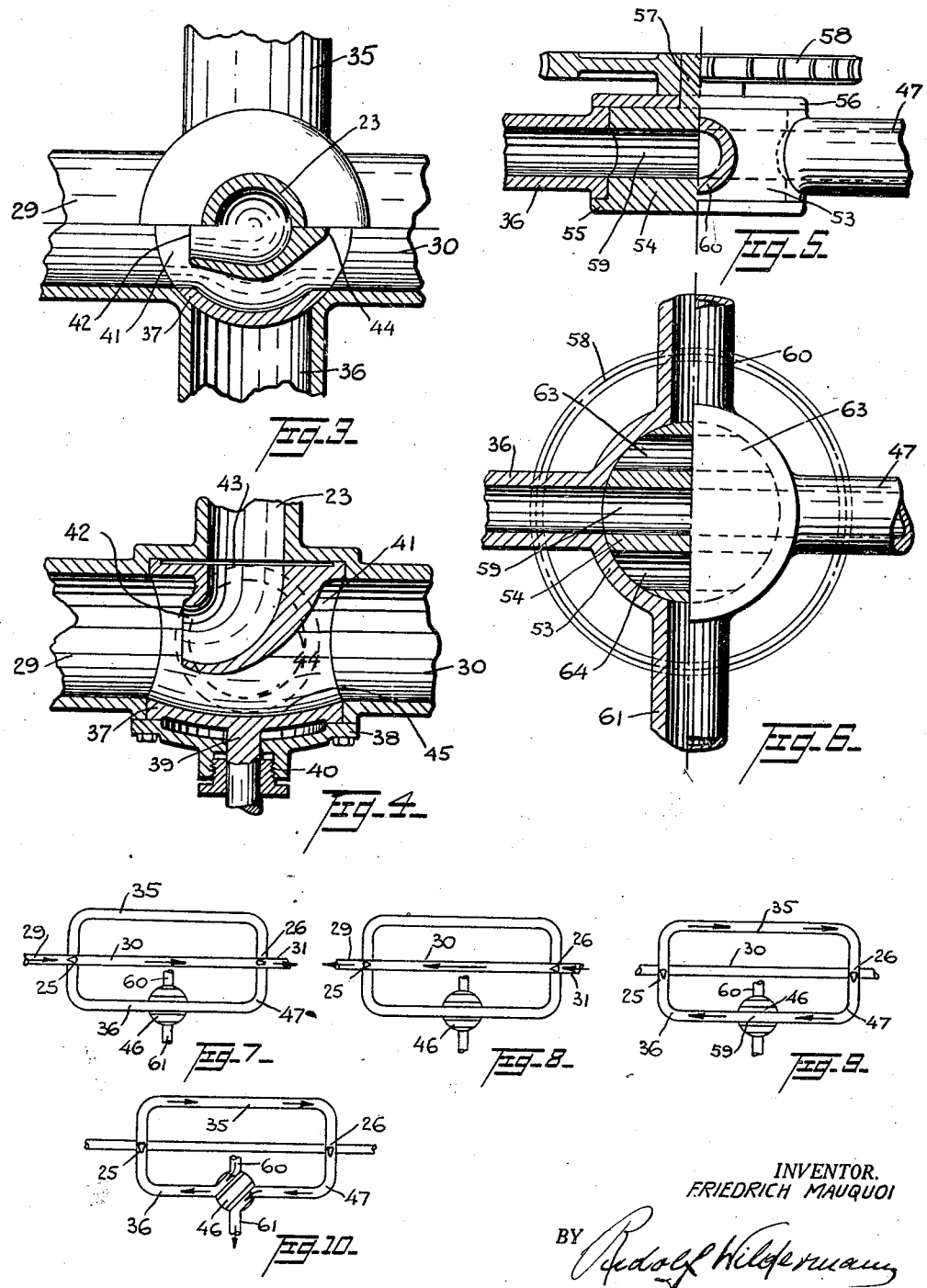

Patented July 23, 1929.

1,721,827

UNITED STATES PATENT OFFICE.

FRIEDRICH MAUQUOI, OF PATERSON, NEW JERSEY.

MEANS FOR HYDRAULIC MARINE PROPULSION.

Application filed April 19, 1928. Serial No. 271,181.

My invention relates to means for hydraulic injector propulsion of boats, more particularly to means in which a high pressure stream of water causes the flow of large volumes of water in large channels running through the boat and the flow of the water in these channels causes the propulsion of the boats.

The objects of my invention are, first, to eliminate all propelling gearing on the outside of a vessel; second, to be able to operate the prime mover for the propulsion of the boat at a constant speed regardless of the steering operations and of the speed at which the boat is moving forward, backward or sideways and third, to be able to use the propelling means for propulsion sideways as well as forward and backward.

I attain these objects by the mechanism illustrated in the accompanying drawings in which:

Figure 1 is the sectioned top view of part of a boat in which I embody my invention.

Figure 2 is the corresponding sectioned side view.

Figure 3 shows a view, partly sectioned, of my rotatable injector head.

Figure 4 is the corresponding sectioned top view.

Figure 5 shows the partly sectioned side view of a four-way cock which I use for steering sideways.

Figure 6 is the corresponding bottom view.

Figures 7, 8, 9 and 10 are schematic views of the channels illustrating the direction of flow at the various settings of the controls.

Similar numerals refer to similar parts throughout the several views.

I consider my method of propulsion of particular advantage in connection with the use of a Diesel engine as a prime mover. Although this type of engine has been of late developed to such a point that its speed and direction of rotation can be controlled in limited intervals of time, there is a particular advantage in respect to smooth operation of such an engine as well as to the reaction of the boat to the movements of the prime mover in operating the engine at a constant speed. This refers not only to Diesel engines, but also to turbines and other prime movers which develop a maximum efficiency at a certain speed and give the best results in regard to wear, tear and maintenance when constantly operated at that speed. In Figure 1 only half the boat is shown, the other half being symmetrical. A vertical Diesel engine 11 is shown arranged near the center of the boat and its horizontal shaft 12 protruding beyond fly-wheel 13 drives, by means of worm 14, the worm-wheel 15. That wheel is mounted on a horizontal crank shaft 16, from which, by connecting rods 17, the double acting pumps 18 are driven. The intake 19 and outlet 20 of the pumps are respectively connected to pressure tanks 21 and 22 in which by a head of air on top of the water the pressure of the water is balanced as it comes into and leaves the pumps. The respective outlets 23 and 24 of the pressure tanks are connected to the injector heads 25 and 26, respectively, which are built into the main channel 28.

That main channel has its intake through a hole 27 in the hull, a little ahead of the center of the boat. Its section 29 enters the first injector head 25, which the channel section 30 connects to injector head 26. From there the channel continues by section 31 to an opening 32 in the rear of hull of the boat, near the rudder 33.

That main channel is located below the level of the floor 34 on which the prime mover and the pump are located.

The injector heads 25 and 26 represent, essentially, four-way cocks comprising an injector inlet in the direction of the continuation of the stem and an injector nozzle in the middle of the passage way. The injector head is illustrated in Figures 3 and 4 and numerals relating to the channels refer to the left injector head 25. In Figure 3 there is, therefore, to the left of the injector head, the channel 29 and to the right of it channel 30. The channels protruding from the injector head, at right angles to the other ones, up and down, are 35 and 36 respectively. Into the chamber in which the four channels converge is rotatably inserted the cylinder 37. That cylinder is held in the chamber by a cover 38 through which a stem 39 on the cylinder passes out from the chamber, through stuffing box 40. The cylinder has a hole 41 at right angles to its axis, which is in line with the channels 29 and 30, or the channels 35 and 36, according to the way in which the cylinder is set by the controlling means fastened to stem 39 on the outside of the chamber. Coaxial with the hole in the cylinder is an orifice 42, which represents the opening of an elbow channel, and the opening 43 at the other end thereof opens upon the outlet 23. Facing that opening 43 in the cylinder there is a hole in the chamber of the same diameter to which attaches the outlet 23 from the pressure tank 21. On the back of the elbow part of the injector is a fin 44 which serves to reduce the resistance which the injector offers to the water passing through the hole 41. The hole in the cylinder is spared out at 45 above the injector, to increase the area of the hole at that point where its cross-section has been reduced by the elbow injector.

Into injector head 25 opens the outlet 23 from tank 21: The outlet 24 from the tank 22 opens into a similar injector head. The upper channel 35 is looped from one of the injectors to the other. Into a similar lower loop a control cock 46 is inserted between the channel 36 coming from the first injector head 25 and the channel 47 entering the injector head 26 from below. In injector head 26, the channels 30 and 31, respectively, take the place of channels 29 and 30 on the sides of injector head 25. On the stems 39 of the two injector heads are mounted the worm-wheels 48 and 49. These worm-wheels are the same in pitch, pitch diameter, etc.; but whereas one of them has a right hand lead, the other one has a left hand lead, and the worms 50 and 51 match these respective leads and are mounted on the common shaft 52. It is readily seen that operation of that shaft 52 will turn the worm-wheels and thereby the injectors in opposite directions, so that at various settings of the shaft the injectors will take positions symmetrical in respect to an imaginary plane between the two injector heads. The injector head 25 is connected to the suction, whereas injector head 26 is connected to the pressure end of the pump. At various settings the respective positions of the orifice of the injectors will be as follows: If the suction orifice faces to the left the pressure orifice faces to the right (Fig. 7). If the suction orifice faces to the right the pressure orifice faces to the left (Fig. 8). If the suction orifice faces down, the pressure orifice will face down (Fig. 9), and correspondingly they will both face upward, in a certain setting.

The cock 46 has a circular shell 53 into which fits the rotatable disc 54. That disc is held in the shell by a shoulder 55 on one end and a cover 56 on the other end. A stem 57 on the disc passes through the cover and carries on its end a worm-wheel 58.

There are three parallel holes in the cylindrical part 53. The hole 59, in the center, lines up with the channels 36 and 47 when the cock is in the position shown. Two other channels 60 and 61 issue in horizontal direction, at right angles to 36 and 47, from the shell 53; 60 connects to a similar channel 61 on the corresponding cock on the star-board side of the boat; channel 61 extends to the port side of the boat and issues through the hull of the boat by opening 62.

The two other holes 63 and 64 are arranged in the same horizontal plane with and on both sides of the hole 59 in disc 54. They pierce the periphery of the disc at points which are displaced at angles of 45° from the points in which the hole 59 cuts that periphery. If therefore, by a turn through 45° of the worm-wheel 58, the disc 54 is rotated in its seat in counterclockwise direction, the hole 63 will face the channels 36 and 60 and the hole 64 will face the channels 61 and 47. This brings the cock into the position shown in Figure 10. By a turn of 45° in clockwise direction, from the position shown in Figures 5 and 6, hole 63 will connect 60 and 47, whereas hole 64 will connect channel 36 to channel 61. In either one of the above mentioned 45° positions, the hole 59 assumes a position in which it faces the walls of the casing.

Worm-wheel 58 engages in a worm 65 on a horizontal shaft 66 located below shaft 52. The corresponding worm-wheel 58 on a similar cock, in the half of the boat which is omitted in Figure 1, also engages in the worm 65. Similarly, the stems 39 on the injector heads connect to similar shafts on similar injector heads in the omitted half of the boat, so that all injector heads are simultaneously operated from the shaft 52, whereas shaft 66 controls the two four-way cocks.

In small boats these two shafts are operatively extended to the bridge, so that the operations of propulsion can be directly controlled from there. In the case of larger boats there may be hydraulic means connected to the two shafts; or an electric motor may serve to regulate these means controlling the flow of the water.

Normally the cock 46 is in the position shown in Figures 5 and 6. When the ship is to move forward the injectors are placed into the position of Figure 7, the injector 25 sucking the water from channel 29 and causing the bulk of the water in that channel to move astern in the boat through channel 30 towards injector head 26, and this movement of the water is increased by the flow, under pressure, from injector 26 so that the water in channel 28 sweeps through the length of the boat from the bow to the stern.

When the injector heads have the position of Figure 8 the water flows in the direction opposite to that of Figure 7, from section 31, through section 30 to section 29, as indicated by the arrow heads. This setting of the injectors will therefore cause the boat to move astern. In the position of Figure 9, which is a position of the injector heads half way between their position of Figure 7 and that of Figure 8, the water moves in a circuit, through sections 36, 35, 47 and hole 59 in the four-way cock, the circulation of the water being entirely limited to that circuit inside of the boat. This represents the neutral position, in which the water in no way enters upon or leaves the boat and therefore no movement of the boat is caused. There may be intermediary positions between that of Figure 9 and those of Figures 7 and 8, in which part of the water follows the path of the circle of Figure 9 and part of it follows the arrows of either one of the other figures, thereby causing only a part of the water to flow into and out of the boat, the boat moving at a reduced speed. The controls on the four-way cock are such that normally that cock stands in the position of Figures 7, 8 and 9.

When the injector heads are in the neutral position of Figure 9,—or are both turned upward, which represents another neutral position,—the four-way cock may be operated to assume the position of Figure 10. In that case the water is sucked through the channel from the star-board side of the boat and leaves it on the port side, thereby causing motion of the boat in the star-board direction. If the cock is turned into a position at 90° from that of Figure 10, the boat will move towards the port side. In the operation of the four-way cock there is also a possibility of intermediary positions in which part of the water flows through the neutral circuit, thereby causing a sideway motion of the boat at reduced speed.

It is seen from the foregoing that the speed of control of a boat using my means of propulsion depends only upon the speed at which the injector head and four-way cock can be operated. Since that speed, in either instance, does not involve any reversal of mechanical parts having a particular momentum, all control operations require only a fraction of the time ordinarily necessary for that purpose. It is furthermore evident that propulsion in one of the directions of the length axis and in one of the directions sideways can be combined at any time by a certain setting of the controls. Therefore my means of propulsion allow the skipper to operate without the rudder, and they facilitate the maneuvering of a boat in every respect.

The inlet 27 of the water is chosen in the position shown to limit the length of channel 28 as much as possible, since friction of the water in the channels is the principal loss encountered in the use of my means of propulsion. That intake must of course open towards the bow of the boat so that the suction applies in that direction. The ideal location for channel 28 is of course near the length axis of the boat and parallel to it. But the friction under those circumstances is larger than under the conditions shown. Of course, instead of opening towards the side of the boat, intake 27 may be arranged at the bottom of the boat, but similarly opening towards the bow, so that the suction causes a flow of water opposite to the direction of movement.

Whereas for the channels a round cross-section is preferable, I may adopt particular shapes for the orifices at the intake 27 and at the outlets 32 and 62 of the channels, so as to produce the strongest sucking, pressing, or frictional engagement between the water flowing through the boat and the surrounding water. Similarly I may shape the orifice 42 of the injector so as to obtain as large a flow of water in the channels as possible.

It is advisable to bring about a better balance in the tanks 21 and 22 by connecting by a bypass, respectively, the suction and pressure tanks on either side of the center line of the boat. A valve may be provided in these pipes in case one or the other side is to be operated independently.

Instead of placing the elbow injector nozzle into the passage of a cock I may omit the side walls of that passage of the cock and turn the nozzle in a channel, for operation forward and backward. Under these circumstances, channels 35 and 36 are omitted leaving only the alternative of moving forward or astern as available in the means for propulsion used today.

The neutral loop 36, 35, 47 is shown in the drawings as a full loop independent of the main channel 28. I have chosen this arrangement in my drawing to simplify the explanation of the principle of the operation of my invention. In practice I omit the upper half 35 of a loop and connect on the injector head the opening, in which that channel 35 faces the cylinder 37, by a groove on the inside of the chamber to the adjoining opening of channel 30. In other words, one end of hole 41 will always open into channel 30; channels 35 and 30 are thereby made one. The functioning of the channel system remains, however, the same.

I do not want to limit myself to the use of a suction injector as well as of a pressure injector, but I may use only one, preferably the pressure injector, the intake of the pump being arranged so as to suck the water in, directly, from some orifice on the outside of the boat facing the bow, or connected to the intake channel. Of course, it is not necessary that the means of propulsion are used in duplicate, on either side of the center line of the boat, but one pump with one set of controls is sufficient.

I do not want to limit the scope of my invention to the use of reciprocating pumps, but it is evident that my improvements will work equally well in connection with a centrifugal pump, the use of which promises greater efficiency when the prime mover is operated at a very high speed (turbine); under these circumstances the pump is coupled directly to the prime mover.

I claim:

1. Means for propelling a boat by water pressure, comprising a pump issuing water under pressure, a longitudinal channel through said boat, a looped channel inside of said boat and means located in and common to both of said channels by which said water under pressure is injected under complementarily selective control into said two channels.

2. Means for propelling a boat by water pressure, comprising a pump issuing water under pressure, longitudinal, transverse and looped channels, and means for complementarily and selectively injecting said water under pressure into said channels, said means controlling said longitudinal and looped channels being located therein and common thereto.

3. Means for propelling a boat by water pressure, comprising a pump issuing water under pressure, longitudinal, transverse and looped channels, cocks, the ports of which complementarily control said channels where they cross each other, and jet nozzles in some of said ports to which is fed said water under pressure.

4. Means for propelling a boat, comprising pumps, suction intakes and pressure outlets on said pumps, longitudinal and transverse channels through said boat, looped channels in said boat, cocks where said channels cross each other, ports in the valves in the bodies of said cocks, complementarily controlling said channels, and jet nozzles in said ports, half of which are connected to said suction intakes and the other half of which are connected to said pressure outlets.

5. Means for propelling a boat, comprising pumps, suction intakes and pressure outlets on said pumps, longitudinal and transverse channels through said boat, looped channels in said boat, cocks where said channels cross each other, ports in the valves in the bodies of said cocks complementarily controlling said channels, jet nozzles in said ports, half of which are connected to said suction intakes and the other half of which are connected to said pressure outlets, and means of control operating said cocks, to the jet nozzles in which said suction intakes are connected, in a direction opposed to that of said cocks, to the jet nozzles in which said pressure outlets are connected.

6. In means of the character described, in combination with a cock consisting of a body, a valve in said body, a port in said valve and a stem on one end of said valve, an opening in said body opposite said stem and a jet nozzle located in said port and forming part of said valve, the entrance of which faces said opening in said body and the orifice of which is coaxial with said port.

Signed at New York in the county and State of New York this 16th day of April, A. D. 1928.

FRIEDRICH MAUQUOI.